United States Patent [19]

Krause

[11] Patent Number: 4,792,459

[45] Date of Patent: Dec. 20, 1988

[54] PROCESS AND APPARATUS FOR PRODUCING VODKA

[76] Inventor: Manfred Krause, Box 7, D-6501 Bodenheim, Fed. Rep. of Germany

[21] Appl. No.: 48,462

[22] Filed: Apr. 28, 1987

Related U.S. Application Data

[63] Continuation of Ser. No. 605,002, Apr. 27, 1984, abandoned.

[51] Int. Cl.$^4$ .................. C12G 3/10; C12G 3/06; B01D 3/00; B01D 5/00
[52] U.S. Cl. .................. 426/592; 426/387; 203/98; 203/DIG. 13
[58] Field of Search .................. 426/11, 592, 387; 203/94, 98, DIG. 9, DIG. 11, DIG. 13

[56] References Cited

FOREIGN PATENT DOCUMENTS

| | | | |
|---|---|---|---|
| 0732591 | 4/1966 | Canada | 426/11 |
| 0599498 | 7/1934 | Fed. Rep. of Germany | 426/592 |
| 0960249 | 9/1982 | U.S.S.R. | 426/592 |
| 0368793 | 4/1932 | United Kingdom | 203/94 |
| 1472980 | 5/1977 | United Kingdom | 426/592 |
| 2133804 | 8/1984 | United Kingdom | 426/11 |

*Primary Examiner*—Elizabeth C. Weimar
*Attorney, Agent, or Firm*—Townsend & Townsend

[57] ABSTRACT

A process for producing vodka by distilling one aqueous solution of alcohol having a relatively low alcohol content from a potstill. The volume of the solution in the still is maintained by a flow of another aqueous solution of alcohol of relatively high alcohol content. The vapor is condensed to produce Vodka. In the process the one solution has an alcohol content of about 4.5% by volume and a mineral content. The other solution has an alcohol content of about 41% by volume. The distillate is condensed and admixed with undistilled solution from the still to provide a vodka with an alcohol content of about 40% and the minerals content from the first solution. An apparatus able to carry out the process is described.

1 Claim, 1 Drawing Sheet

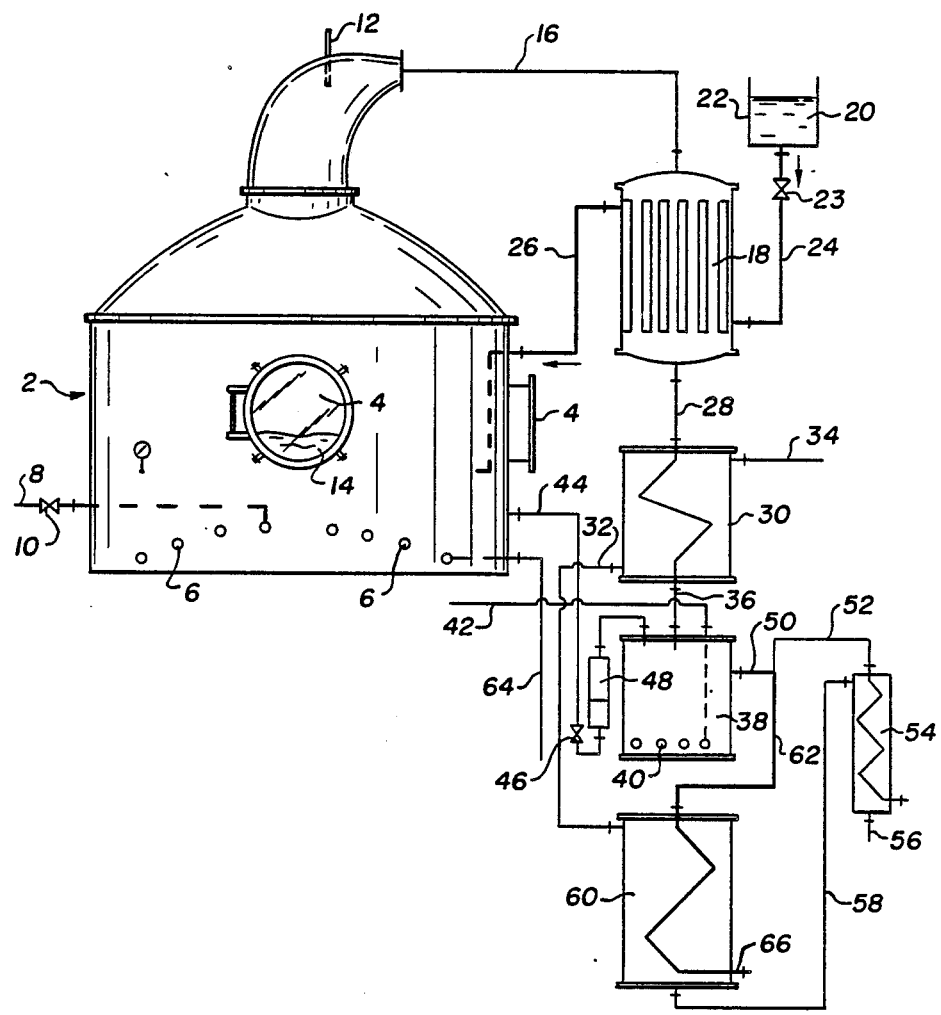

PROCESS AND APPARATUS FOR PRODUCING VODKA

This is a continuation Ser. No. 605,002 filed Apr. 27, 1984, now abandoned.

FIELD OF THE INVENTION

This invention relates to a process for producing vodka and to an apparatus for producing vodka using that process.

DESCRIPTION OF THE PRIOR ART

Vodka is a drink of some considerable antiquity, usually produced by mixing ethyl alcohol of high purity with soft water. A charcoal treatment for filtration and absorption of color and flavour is common and may be required in some countries, for example Canada. In some countries in Europe small amounts of minerals may be added and even in some circumstances a limited amount of sugar. Several brands of vodka are based on a particular kind of mineral, resembling the early days of production of vodka where, for example, the water of a certain area would impart a certain flavour to vodka from that area.

It is now common in producing vodka to carry out a second distillation or rectification of the alcohol and water to get a more intensive mixing of the two predominant ingredients and to facilitate the formation of any compounds that may be formed, for example hydrates of ethyl alcohol. By second distillation is meant a distillation subsequent to the distillation by which the alcohol is formed, a process common to all liquor-producing processes. This hydrate is better formed during the gas phase than in the liquid phase because of the higher temperature. The idea of introducing the additional rectification, that is subsequent to the distillation by which the alcohol in the vodka is produced, is due to Awaloff and is described in German Patent No. 599,498 issued July 3, 1934. In the process evolved by Awaloff a pure distillate without any minerals is produced. A continuing flow of vodka, containing the usual 40% alcohol, runs from a storage tank to a potstill containing a liquid of about 4% by volume of alcohol. Distillation takes place in the potstill and the spirit produced again has a 40% alcohol content. The flow from the storage tank to the potstill is carefully controlled to match the flow leaving the tailbox, after the cooler. This ensures a steady strength of 40% alcohol by volume.

As indicated the process of Awaloff produces a pure distillate having an alcohol content of 40% by volume. The liquor is soft, that is there are no minerals present, because of the secondary distillation the vodka has undergone.

The present invention seeks to produce a vodka in which the minerals occurring in the local water may be present. Alternatively the minerals that are to be added may be at the discretion of the distillery and may reflect the particular flavour that the distiller finds to be most popular with consumers.

SUMMARY OF THE INVENTION

Accordingly, in a first aspect, the present invention is in a process for producing vodka by distilling a first aqueous solution of alcohol having a relatively low alcohol content from a potstill, the volume of the first solution in the still being maintained by a flow of a second aqueous solution of alcohol of relatively high alcohol content and condensing the vapour to produce vodka and is the improvement whereby (a) the first solution has an alcohol content of about 4.5% by volume and a minerals content, (b) the second solution has an alcohol content of about 41% by volume and (c) the distillate from the first solution is condensed and mixed with the undistilled first solution to provide a vodka with an alcohol content of about 40% and a minerals content from the first solution.

In a further aspect the present invention is in an apparatus for producing a vodka containing the required about 40% by volume alcohol and containing minerals, the apparatus comprising a still, a condensor communicating with the still and a cooler subsequent to the condensor to control the temperature of the vodka, and is the improvement comprising an intermediate tank to communicate (a) with the condensor and (b) with the supply of an aqueous solution of alcohol of low alcohol content and with a mineral content whereby the distillate from the condensor may be mixed with the aqueous solution of low alcohol content to produce a vodka of the required alcohol content containing minerals from the aqueous solution of alcohol of low alcohol content.

Preferably the apparatus includes a pipe extending from the still to the intermediate tank whereby the a solution of alcohol low in alcohol is the solution from the still, prior to its distillation.

BRIEF DESCRIPTION OF THE DRAWINGS

The invention is illustrated, merely by way of example, in the accompanying drawing which is a flow diagram of vodka production according to the present invention:

DESCRIPTION OF THE PREFERRED EMBODIMENT

The drawings show an apparatus that comprises a conventional potstill 2 having viewing openings 4, heating coils 6 fed by steam through a line 8 having a valve 10. There is a thermometer 12 to read the temperature of the vapour. In the potstill there is distilled a first aqueous solution 14 of alcohol having a relatively low alcohol content, according to the process of the present invention, about 4.5% by volume of alcohol. The vapour passes from the potstill along pipe 16 to a condensor 18. The cooling fluid for the condensor is a second aqueous solution 20 of alcohol of relatively high alcohol content, about 41% by volume alcohol according to the present invention, which passes from tank 22 through a pipe 24 having a valve 23 through the condensor 18 to condense the vapours from the potstill 2. The thus warm second solution 20 passes through pipe 26 into the potstill 2 where it is distilled. The condensate passes from the condensor 18 through pipe 28 to a precooler 30 cooled by a coolant, usually water, entering through pipe 32 and leaving through pipe 34. From the precooler 30 the condensate passes through pipe 36 to an intermediate tank 38 fitted with air supply openings 40 fed by air through pipe 42 so the contents of the intermediate tank 38 may be stirred and mixed properly.

There is a supply of first aqueous solution 14 of alcohol to the intermediate tank 38 through pipe 44 from the potstill 2. The flow in the pipe 44 is through a valve 46 and through a flow meter 48 as the intermediate tank 38 is essentially a proportioning tank in which a supply of the condensate and a supply of the first aqueous solution 14 of alcohol are mixed together to produce a vodka of the appropriate strength.

Air used as the mixing agent in the intermediate tank 38 leaves the tank through pipe 50 and bleeds through pipe 52 to a conventional aldehyde cooler 54. Cool water enters the aldehyde 54 cooler through pipe 56 and leaves through pipe 58. It then passes through a final cooler 60, leaving through pipe 32 and passes to the precooler before leaving the system through pipe 34. The vodka leaves the intermediate tank 38 through pipe 50 and passes to pipe 62 and through the final cooler 60 to a conventional tailbox (not shown) through pipe 66. The function of the tailbox is conventional, that is to provdde final control of the alcohol content of the vodka.

In the process of the present invention the second solution 20 of alcohol is approximately 41% by volume alcohol made up of decarbonated, soft water and ethanol of approximately 96.6% purity. In the condensor 18, where it is used as coolant, this liquid is warmed to a temperature of about 65° to 70° C. The condensate leaving the condensor 18 has a temperature in the range 70° to 75° C. After the intermediate tank 38 the condensate should have a temperature of about 60° C. As in conventional practice the thermometer 12 reads the vapour temperature and, depending on the reading, the valve 10 is controlled to regulate the flow of heating steam into the potstill. The steam leaves the potstill 2 through pipe 64.

The condensate entering the intermediate tank 38 has an alcohol strength of about 43% by volume. The solution 14 in the potstill 2 has an alcohol strength of about 4.5% by volume and these are mixed in proportion according to the following scheme to get the correct mixture, that is a vodka containing 40% alcohol.

|        |     |        |
| ------ | --- | ------ |
| 4.5%   |     | 3.0%   |
|        | 40% |        |
| 43.0%  |     | 35.5%  |
|        |     | 38.5%  |

| That is: | in 38.5 l are 3.0 l liquid of 4.5% alc. vol. |
|---|---|
|  | in 100.0 l are 7.8 l liquid of 4.5% alc. vol. |
| 7.8 l of 4.5% alc. vol. = | 0.35 l alcohol |
| 92.2 l of 43.0% alc. vol. = | 39.65 l alcohol |
| 100.0 l liquor contain: | 40.0 l alcohol |

Concerning the apparent slight discrepancy it should be noted that a little alcohol is normally lost in the aldehyde cooler.

It will, of course, be noted that the vodka produced by the process and in the apparatus of the present invention contains the minerals introduced into the potstill by the supply of water and that these minerals are passed directly to the intermediate tank 38 through pipe 44. That is the vodka contains the undistilled liquid from the potstill and, in this way, the product can be produced in which naturally occurring minerals in, for example, soft water, can be introduced into the vodka.

I claim:

1. A continuous process for producing vodka comprising the steps of combining a liquid base having an alcohol content of more than 40% by volume with water including minerals normally present in natural water to form a solution having an alcohol content of about 4.5% by volume, heating the solution to generate a vapor having a higher alcohol content than the liquid base, condensing the vapor and bringing it in thermal contact with the liquid base to thereby transfer heat from the vapor to the liquid base and raise the temperature of the latter while condensing the vpaor into a distillate; flowing the distillate into a mixing chamber; flowing an amount of the solution into the mixing chamber at a rate selected so that the resulting mixture in the chamber has an alcohol content of about 40% by volume and includes the minerals which are present in the water added to the liquid base to thereby impart a distinct flavor to the resulting vodka, and intimately mixing the distillate and the solution in the chamber.

* * * * *